United States Patent [19]

DesJardins

[11] Patent Number: 5,280,337
[45] Date of Patent: Jan. 18, 1994

[54] DEPTH-BASED VIDEO COMBINING

[75] Inventor: Philip A. DesJardins, Nevada City, Calif.

[73] Assignee: The Grass Valley Group, Inc., Nevada City, Calif.

[21] Appl. No.: 960,325

[22] Filed: Oct. 13, 1992

[51] Int. Cl.$^5$ .......................................... H04N 5/262
[52] U.S. Cl. .................................... 358/183; 358/182
[58] Field of Search ............... 358/183, 182, 181, 180, 358/22, 21 R, 160; 340/721; H04N 5/262, 5/275, 5/265, 5/268, 5/272, 5/278

[56] References Cited

U.S. PATENT DOCUMENTS

| | | | |
|---|---|---|---|
| 4,851,912 | 7/1989 | Jackson et al. | 358/183 |
| 4,875,097 | 10/1989 | Jackson | 358/180 |
| 5,077,608 | 12/1991 | Dubner | 358/22 |
| 5,121,210 | 6/1992 | Hirayama | 358/183 |

FOREIGN PATENT DOCUMENTS

| | | | |
|---|---|---|---|
| 0199489 | 10/1986 | European Pat. Off. | H04N 5/260 |
| 0260998 | 3/1988 | European Pat. Off. | H04N 5/262 |
| 0162483 | 6/1989 | Japan | H04N 5/262 |
| 2252009 | 7/1992 | United Kingdom | H04N 5/262 |

*Primary Examiner*—James J. Groody
*Assistant Examiner*—Michael H. Lee
*Attorney, Agent, or Firm*—Francis I. Gray

[57] ABSTRACT

A depth-based video combiner that combines two video signals to produce a combined video signal as a function of respective key signals and a priority signal derived from respective depth coefficient signals also combines the respective depth coefficient signals as a function of the respective key signals and the priority signal to produce a combined depth coefficient for the combined video signal to provide smooth depth transitions at intersecting edges between the two video signals. A mix coefficient for the depth coefficient signals is generated from the respective key signals and the priority signal. The mix coefficient signal is used to combine the respective depth coefficient signals to produce the combined depth coefficient signal.

7 Claims, 1 Drawing Sheet

DEPTH-BASED VIDEO COMBINING

BACKGROUND OF THE INVENTION

The present invention relates to video signal processing, and more particularly to depth-based video combining which creates a combined depth that preserves smoothness for further combining operations.

Digital picture manipulation devices take an incoming video image and remap the pixels to another video image to make the incoming video image appear to have been moved or warped in three dimensional space. A digital picture manipulator (DPM) transforms one image per channel, with this image containing luminance, chrominance and key (opacity) information. Often a digital picture manipulator manipulates more than one video channel and the channels are combined into a single resulting channel. A problem arises when a pixel of the combined image has contributions from two transformed source images, i.e., a decision has to be made to give priority to one video image over the other. The Kaleidoscope DPM-1 digital picture manipulator, manufactured by The Grass Valley Group, Inc. of Nevada City, Calif., United States of America, uses the calculated depth of the transformed source images to determine priority, i.e., the image appearing closer to the viewer having priority over the farther appearing image.

The Kaleidoscope digital picture manipulator's depth-based combiner creates a priority signal that determines the priority of a foreground image over a background image. This priority signal is input to a combiner as described in U.S. Pat. No. 4,851,912 issued Jul. 25, 1989 to Richard A. Jackson and Kevin D. Windrem entitled "Apparatus for Combining Video Signals." Which signal is the "foreground" and which the "background" is determined by depth, and can switch on a pixel-by-pixel basis for a combined image, as in the case of intersecting planes. The Kaleidoscope DPM creates the priority signal by using depth information from each image. This information is called W, the depth coefficient, where $$1/W = Z/V_p + 1$$

$V_p$ being the simulated distance of the viewer from the plane upon which the images are perspectively projected and Z being the distance from that plane to the transformed image in three dimensional space prior to perspective projection. W gets smaller, decreasing to zero, as an object in the image goes to infinity, and gets larger as the object in the image approaches the viewer, being clipped at a value of 8 in the Kaleidoscope DPM. Priority is formed from each image's W by the following function, commonly called a clip and gain function, $$P = CLIP(GAIN \times (W_A - W_B)) + \tfrac{1}{2}$$

where $W_A$ is the depth coefficient for image A, $W_B$ is the depth coefficient for image B, GAIN is a softness multiplier and CLIP is a function that returns $-\tfrac{1}{2}$ for values less than $-\tfrac{1}{2}$ and returns $+\tfrac{1}{2}$ for values greater than $+\tfrac{1}{2}$ and passes all values inbetween. The output of the circuit is a number ranging from zero to one. When P is less than $\tfrac{1}{2}$, image A is behind image B and image B has more priority, and when P is greater than $\tfrac{1}{2}$, image A is in front of image B and has more priority. Priorities between zero and one give smoothness to intersecting images and are more visually pleasing than sharp intersections where only zero and one are possible.

A problem associated with depth combining involves a situation where there are more than two images competing for priority. The Kaleidoscope DPM uses a serial method for combining where two images are combined to form a resultant image which is then in turn combined with a third image, whose result is combined with a fourth image, etc. This requires a series of two-input video combiners. Each of the source images has a depth signal, as does each successively combined image. With the serial combiner approach the Kaleidoscope DPM selects the nearest of the two depth values to determine the depth of each combined image. However when the nearest image is nearly transparent, such as along soft edges, setting the resulting depth to that of the nearest image gives the combined image a stronger depth when mixing with a third image later on. For example during a soft edge the depth is that of the near image, even though some of the far image may be seen, and then where the foreground image fades completely, the depth abruptly jumps to that of the far image, i.e., the depth component of the combined image has abrupt changes. If a third image is combined with this result, the abrupt change in depths may cause an abrupt change in the priority signal used in the next combining operation. Such abrupt changes give unpleasant harshness to video images. It would be more pleasing if the depth smoothly changed from that of the nearest image to that of the farthest image during the soft edge.

SUMMARY OF THE INVENTION

Accordingly the present invention provides a depth-based video combiner which creates a combined depth for a combined image formed from two video signals that provides a smooth change in depth between near and far images, represented by the video signals, during a soft edge. The combiner combines respective depth coefficient signals for the two video signals as a function of respective key signals and a priority signal derived from the respective depth coefficient signals to produce a combined depth coefficient for the combined video signal. A mix coefficient signal is used to combine the respective depth coefficient signals to produce the combined depth coefficient signal.

The objects, advantages and other novel features of the present invention are apparent from the following detailed description when read in view of the appended claims and attached drawing.

DESCRIPTION OF THE PREFERRED EMBODIMENT

Figure 1:
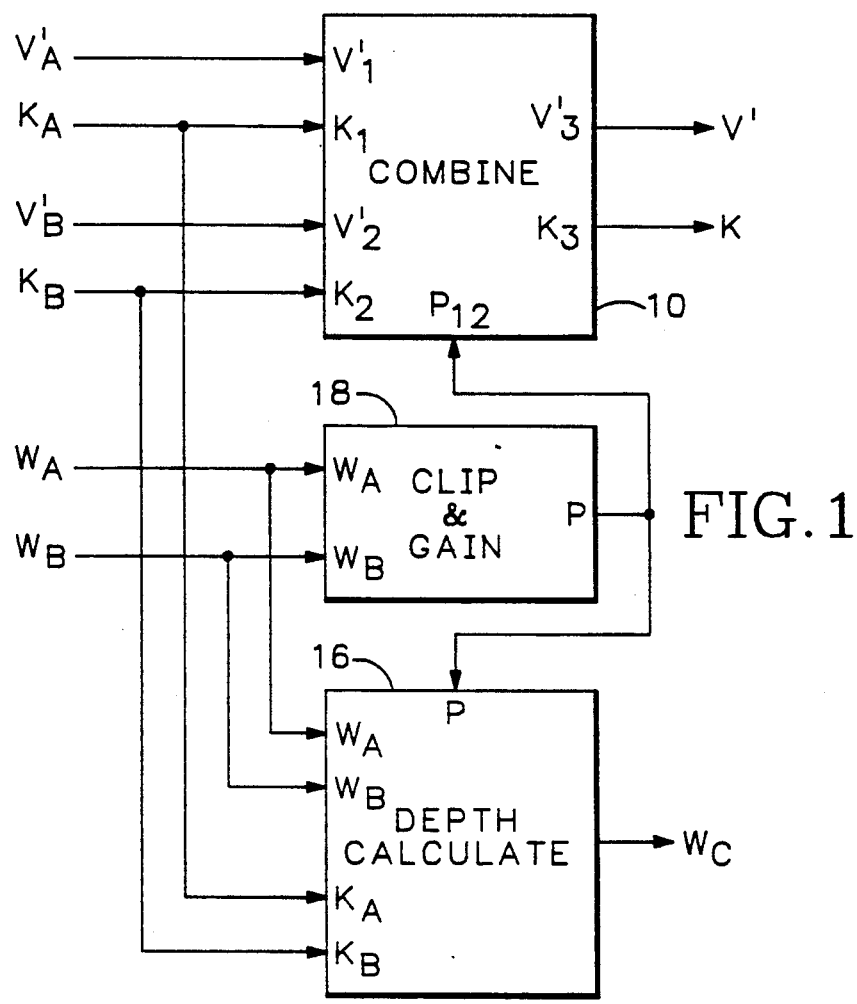
FIG. 1 is a block diagram view of a depth-based video combiner according to the present invention.

Referring now to FIG. 1 a priority video combiner 10, such as that described in U.S. Pat. No. 4,851,912, has as inputs a pair of image signals, each having a shaped video portion $V_A'$, $V_B'$ and a key portion $K_A$, $K_B$. The shaped video portion is the product of the video image V and its corresponding key signal K, as is well known in the art. Also input to the priority video combiner 10 is a priority signal P. The output from the combiner is a shaped video signal V' and associated key signal K. The key signals $K_A$, $K_B$ and the depth signals $W_A$, $W_B$ are input to a depth calculator circuit 16 together with the priority signal P to produce a combined depth coefficient $W_C$. The depth signals are input to a clip and gain circuit 18 to generate the priority signal P.

Figure 2:
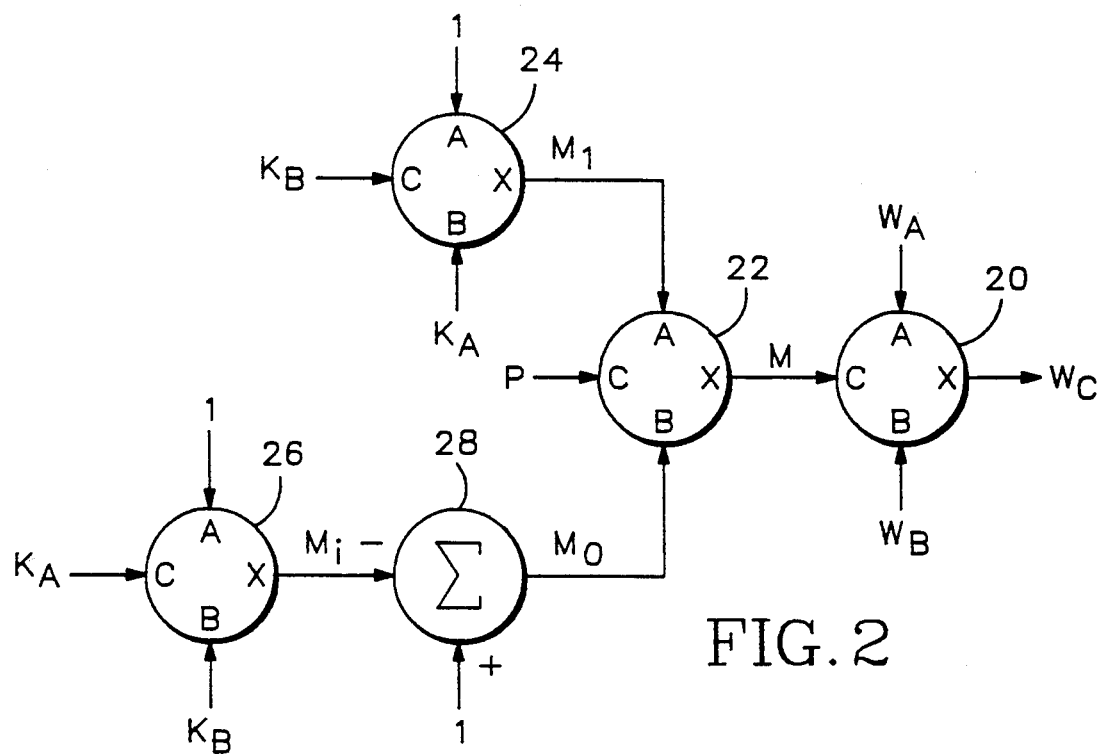
FIG. 2 is a block diagram view of a depth calculator for the depth-based video combiner of FIG. 1 according to the present invention.

The depth calculator 16 is shown in greater detail in FIG. 2. The combined depth coefficient $W_C$ from the depth calculator 16 gives pleasing results in both serial depth-based combining and depth-based recursive effects, which is a special case of serial depth-based combining. The combined depth coefficient $W_C$ is determined as a mixture between the two input depth coefficients $W_A$, $W_B$ via a mixer 20. The mixer 20, as well as the other mixers 22, 24, 26, perform the following function:

$$X = A*C + B*(1-C)$$

where A, B and C are input to the marked ports of the mixers. The mixer control input C, which ranges from zero to one, determines the amount of A versus B in determining the output X. The mixer 20 has as a mixer control input M which determines the ratio of $W_A$ in determining $W_C$. M in turn is a mixture via mixer 22 of two candidate M values $M_1$, $M_0$ that arise in two extreme situations.

The first situation is when P equals one, which occurs when video A appears closer to the viewer than video B. If video A is fully opaque, i.e., $K_A$ equals one, then the mixer control signal $M_1$ should be one. If video A is semi-transparent, i.e., $K_A$ less than one, then $M_1$ may be less than one depending on the opacity of video B as indicated by $K_B$. The mixer 24 creates the signal $M_1$ that ranges between $K_A$ and one based on its own mixer control signal $K_B$. If video A is semi-transparent, $W_A$ can lose some of its influence in determining the combined depth, but only up to the amount $K_A$. If $K_B$ equals one, i.e., video B fully opaque, $W_B$ takes away the remaining influence and $M_1$ remains at $K_A$. But if $K_B$ is less than one, i.e., video B is semi-transparent, then $W_A$ gains more influence, increasing $M_1$, until $K_B$ equals zero, i.e., video B fully transparent, when $M_1$ equals 1.

The second situation is when P equals zero, which occurs when video B appears closer than video A. Following the same reasoning as in the preceding paragraph, but swapping the key signals $K_A$, $K_B$ because of the change in relative depth of the two videos, mixer 26 creates a preliminary $M_i$ mix control signal that determines the mixing ratio for $W_B$. This signal is subtracted from one via a subtractor 28 to generate $M_0$, the mixing ratio for $W_A$. Thus $M_1$, $M_0$ vary smoothly with $K_A$, $K_B$, respectively.

$M_1$, $M_0$ are both mixing control inputs for the P equals one and zero situations respectively. The mixer 20 mixes both of these inputs according to the value of P. In situations where there are no abrupt changes in depth and the gain in clip and gain is not high, then P varies smoothly across the combined image as does the depth mixer coefficient M. This in turn gives smoothness to the combined depth coefficient $W_C$ as determined through the mixer 20 equation:

$$W_C = M*W_A + (1-M)*W_B$$

It is apparent that the equation for $M_0$ is:

$$M_0 = K_A*(1-K_B)$$

which may be generated by a circuit containing just a multiplier and a subtractor. Similarly $M_1$ is described by the equation:

$$M_1 = 1 - [(1-K_A)*K_B]$$

which may be implemented in a variety of topologies. In instances where there is no smooth priority in depth and P essentially switches from zero to one, mixer 20 may be replaced by a multiplexer that selects between $M_0$, $M_1$ when P equals zero and one respectively.

Thus the present invention provides smooth depth transitions from near to far images during a soft edge between intersecting images by calculating a combined depth coefficient for the combination of the near and far images as a function of the individual key signals, depth coefficients and the priority signal derived from the individual depth coefficients.

What is claimed is:

1. In a depth-based video combiner that combines a first video signal with a second video signal as a function of respective key and depth coefficient signals to produce a combined video signal, an apparatus for determining a combined depth coefficient signal for the combined video signal comprising:
    means for determining as a function of the respective key signals and a priority signal derived from the respective depth coefficient signals a mix coefficient signal; and
    means for combining the respective depth coefficient signals as a function of the mix coefficient signal to produce the combined depth coefficient signal.

2. A depth-based video combiner as recited in claim 1 wherein the combining means comprises a mixer having the respective depth coefficient signals as inputs and the mix coefficient signal as a control signal to produce the combined depth coefficient signal according to the function:

$$W_C = M*W_A + (1-M)*W_B$$

where $W_C$ is the combined depth coefficient signal, $W_A$ and $W_B$ are the respective depth coefficient signals and M is the mix coefficient signal.

3. A depth-based video combiner as recited in claim 2 wherein the determining means comprises:
    means for generating a pair of intermediate mix coefficients as a function of the respective key signals; and
    means for combining the intermediate mix coefficients under control of the priority signal to produce the mix coefficient signal.

4. A depth-based video combiner as recited in claim 3 wherein the generating means comprises:
    means for combining one of the key signals with unity under control of the other of the key signals to produce a first one of the intermediate mix coefficient signals;
    means for combining the other of the key signals with unity under control of the one of the key signals to produce a preliminary mix coefficient signal; and
    means for subtracting the preliminary mix coefficient signal from unity to produce a second one of the intermediate mix coefficient signals.

5. A depth-based video combiner as recited in claim 1 wherein the determining means comprises:

means for generating a pair of intermediate mix coefficients as a function of the respective key signals; and means for combining the intermediate mix coefficients under control of the priority signal to produce the mix coefficient signal.

6. A depth-based video combiner as recited in claim 5 wherein the generating means comprises:

means for combining one of the key signals with unity under control of the other of the key signals to produce a first one of the intermediate mix coefficient signals;

means for combining the other of the key signals with unity under control of the one of the key signals to produce a preliminary mix coefficient signal; and means for subtracting the preliminary mix coefficient signal from unity to produce a second one of the intermediate mix coefficient signals.

7. A depth-based video combiner as recited in claim 6 wherein the depth coefficient signals combining means comprises a mixer having the respective depth coefficient signals as inputs and the mix coefficient signal as a control signal to produce the combined depth coefficient signal according to the function:

$$W_C = M*W_A + (1-M)*W_B$$

where $W_C$ is the combined depth coefficient signal, $W_A$ and $W_B$ are the respective depth coefficient signals and $M$ is the mix coefficient signal.

* * * * *